United States Patent [19]
Fishovitz

[11] Patent Number: 5,486,978
[45] Date of Patent: Jan. 23, 1996

[54] DRAW-OUT CIRCUIT BREAKER UNIT WITH COORDINATED CABLE INTERLOCK AND SHUTTER

[75] Inventor: Anthony J. Fishovitz, Freedom, Pa.

[73] Assignee: Eaton Corporation, Cleveland, Ohio

[21] Appl. No.: 334,834

[22] Filed: Nov. 4, 1994

[51] Int. Cl.⁶ .................................................. H02B 1/14
[52] U.S. Cl. ........................................ 361/617; 200/50 C
[58] Field of Search ........................... 200/50 C, 50 AA; 361/606–607, 609, 615, 617

[56] References Cited

U.S. PATENT DOCUMENTS

| | | | |
|---|---|---|---|
| 4,285,026 | 8/1981 | Clausing | 361/617 |
| 4,400,599 | 8/1983 | Richmann | 200/50 C |
| 4,486,815 | 12/1984 | Takahashi | 361/617 |
| 4,565,908 | 1/1986 | Bould | 361/607 |
| 5,227,952 | 7/1993 | Romano et al. | 361/339 |

OTHER PUBLICATIONS

Westinghouse Electric Corporation Distribution and Control Business Unit Electrical Components Division, Article; *Installation Instructions for the Mechanical Cable Interlock for Through the Door Drawout Systems Pow–r Breakers;* Dec. 1992, pp. 1–4.

*Primary Examiner*—Gregory D. Thompson
*Attorney, Agent, or Firm*—Martin J. Moran

[57] ABSTRACT

A cable interlock actuated by a plunger extended from the back of a draw-out circuit breaker when the breaker is closed, prevents closure of a second circuit breaker by holding it in the trip condition. A shutter which closes to prevent access to power system terminations at the rear of the draw-out circuit breaker enclosure when the breaker is removed, blocks operation of the interlock to prevent tripping of the other circuit breaker.

11 Claims, 7 Drawing Sheets

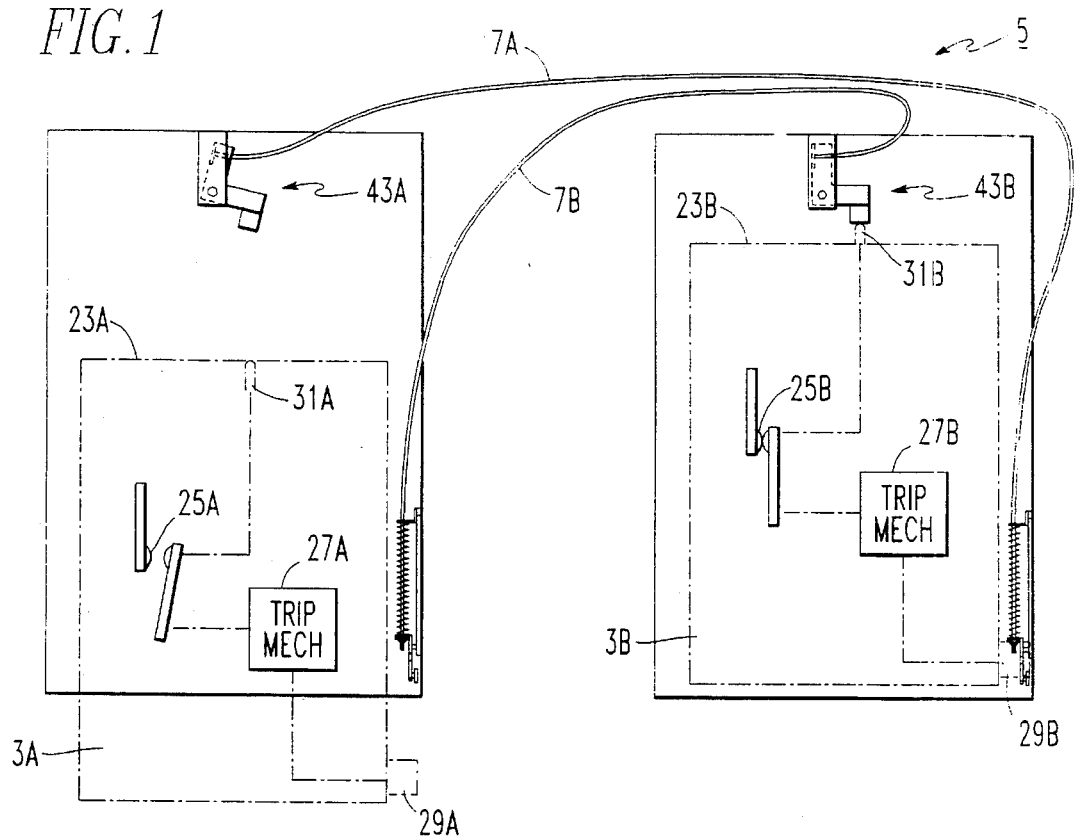
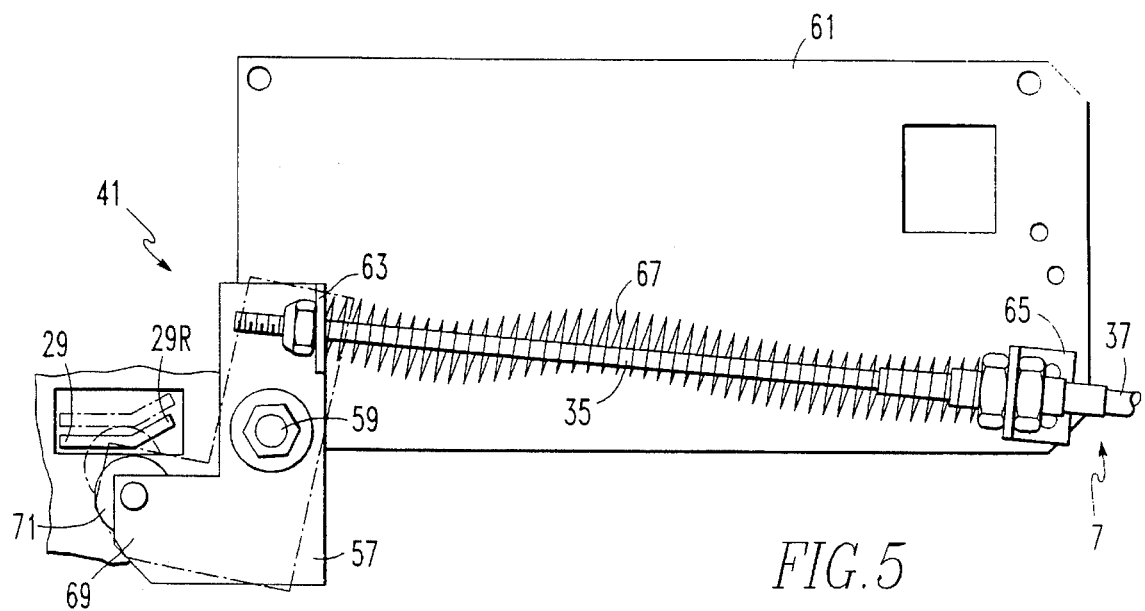

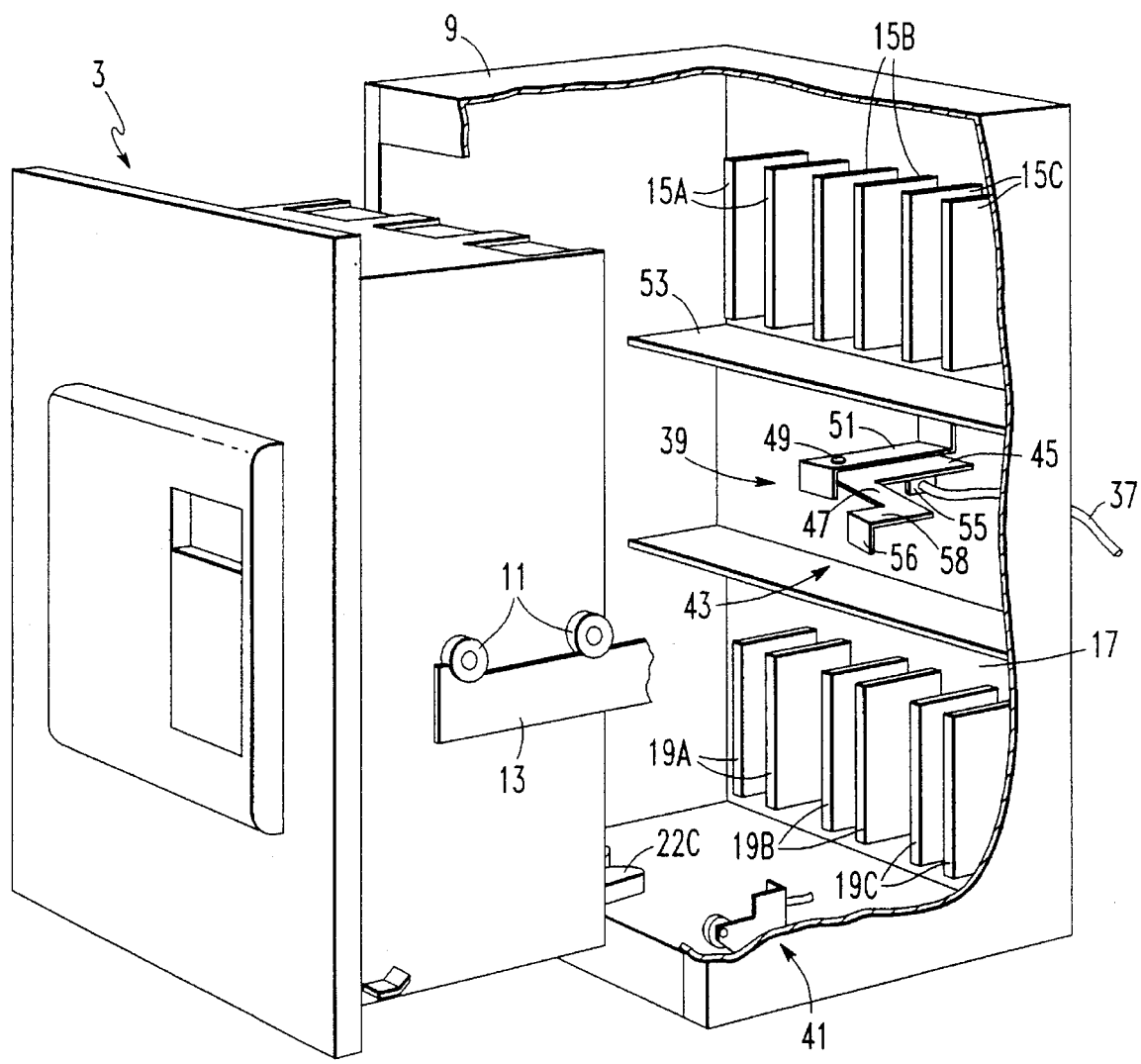

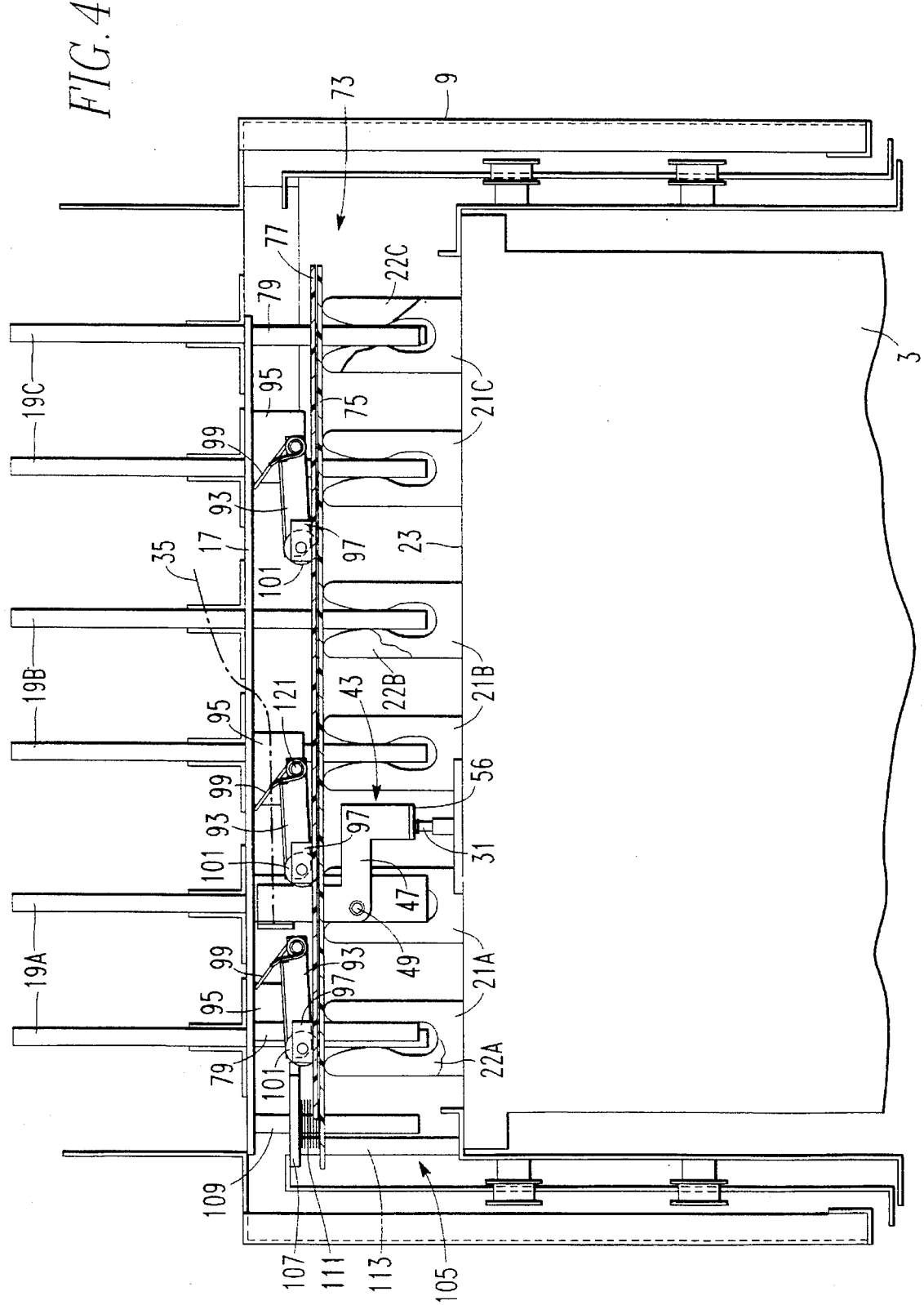

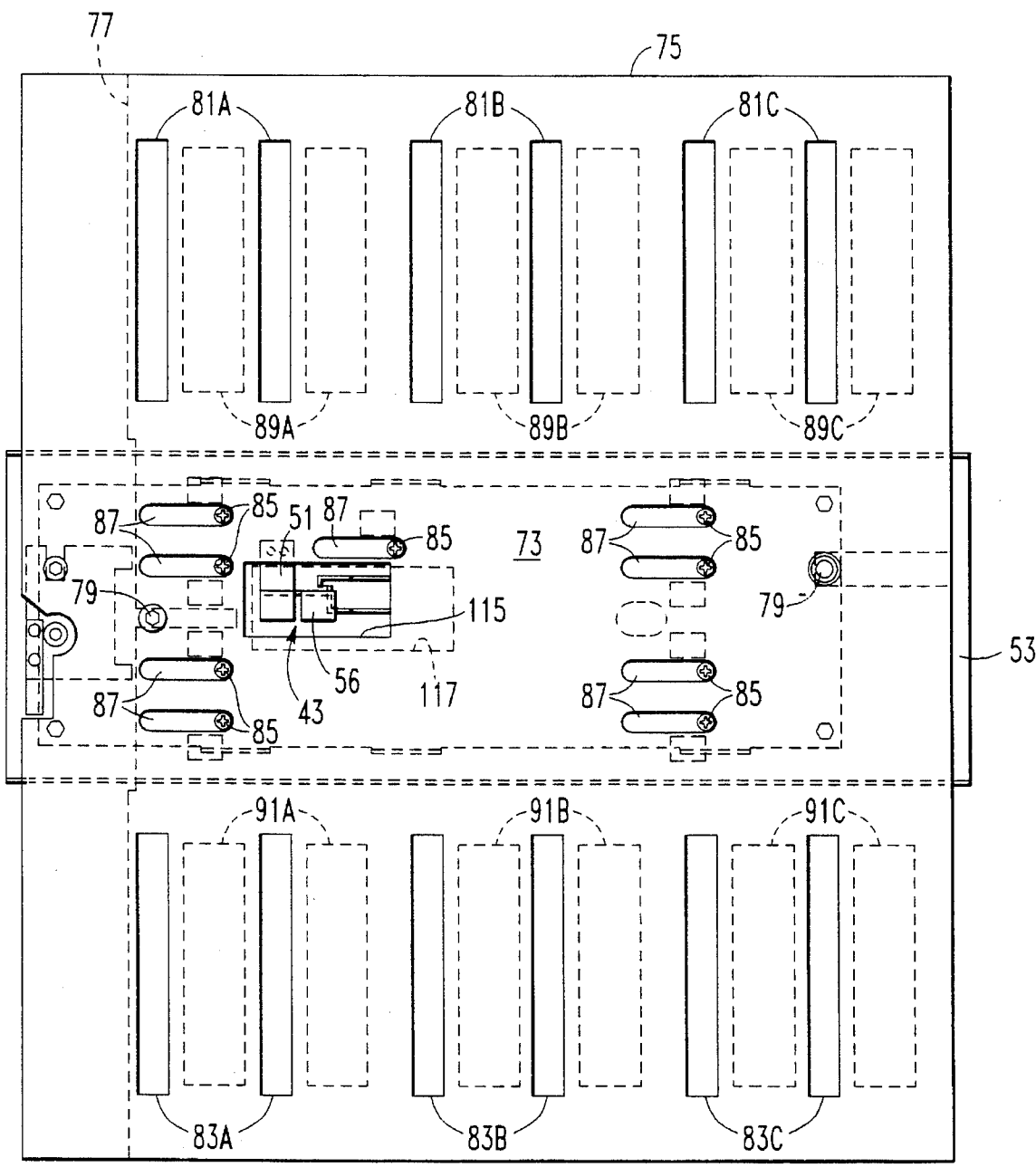

5,486,978

DRAW-OUT CIRCUIT BREAKER UNIT WITH COORDINATED CABLE INTERLOCK AND SHUTTER

BACKGROUND OF THE INVENTION

1. Field of the Invention

This invention relates to circuit breakers, and in particular to draw-out circuit breakers mounted in an enclosure provided with a shutter to block access to the distribution system conductors when the circuit breaker is removed from the enclosure. The invention further relates to an interlock for interlocking two such draw-out circuit breakers to prevent a condition in which both breakers are closed at the same time.

2. Background Information

Low voltage circuit breakers used in electric power distribution systems are commonly mounted in metal enclosures and supported on rollers which permits easy installation and removal of the sizeable circuit breakers required for such service. Typically, the line and load conductors are terminated in the rear wall of the enclosure with stabs which are engaged by finger connectors on the back of the circuit breaker as it is racked into the enclosure. In order to protect personnel from the exposed power system terminations when the circuit breaker is removed, shutters have been developed which automatically close over the stabs as the circuit breaker is withdrawn, and which are opened by inward movement of the circuit breaker during installation.

In some applications, such as, for example, transfer switches which provide alternate power sources to a load, seeps must be taken to ensure that alternate sources with random phase relationship are not connected to the load at the same time. Interlocks have been developed which prevent more than one switch from being closed at any given time. Often, circuit breakers are used as the switches which must be interlocked, and this includes the draw-out low voltage circuit breakers. One form of interlock for such circuit breakers is the cable interlock. Typically, this interlock includes a pivoted arm mounted behind the circuit breaker which pulls on a cable when rotated by a plunger which extends from the back of the circuit breaker when the contacts of that circuit breaker are closed. The cable actuates a device on the other circuit breaker which prevents the contacts of that other circuit breaker from being closed. A similar cable interlock prevents the first circuit breaker from being closed when the other circuit breaker is closed.

It is common for the cable interlock to hold the second circuit breaker in a tripped condition to prevent closure of the contacts. When the first circuit breaker is removed from its enclosure, the interlock mechanism is exposed. Typically, in the case of a transfer switch under these conditions, the second circuit breaker would be closed to connect the alternate power source to the load. Usually, it is important in such applications that power be maintained to the load. However, with the interlock exposed by removal of the first circuit breaker, it is possible that a worker could inadvertently or otherwise actuate the interlock device and trip the second circuit breaker, thereby, interrupting power flow to the load.

Currently, there is no draw-out low voltage circuit breaker having both a shutter and an interlock, as these two mechanisms compete for space behind the circuit breaker. However, there is a need for a draw-out low voltage circuit breaker which provides protection for personnel when the circuit breaker is removed and which when used with another circuit breaker provides that both circuit breakers cannot be closed at the same time. There is a further need for such a circuit breaker unit in which the interlock cannot be actuated when the circuit breaker is removed from the enclosure to prevent an inadvertent or intentional tripping of the other circuit breaker to which the interlock is connected.

SUMMARY OF THE INVENTION

These needs and others are satisfied by the invention which is directed to a draw-out circuit breaker having an interlock which is blocked from preventing another circuit breaker to which the interlock is connected from being closed or maintained closed when the draw-out circuit breaker is removed from the enclosure. Furthermore, the invention is directed to such a draw-out circuit breaker having both an interlock and a shutter, and in fact, to a unique combination in which the shutter when closed upon removal of the circuit breaker prevents actuation of the interlock.

More particularly, the invention is directed to draw-out circuit breaker unit adapted for interlocking with another circuit breaker in an electrical distribution system having conductors with stabs on ends thereof, said unit comprising:

- a circuit breaker having connectors projecting from a rear face thereof for connection to said stabs on said conductors of said electric power distribution system, separable contacts for interrupting current through said conductors, and a trip mechanism for tripping said separable contacts open in response to selected conditions of current in said conductors;
- an enclosure having a rear wall in which said stabs on said conductors on said electric power distribution system are mounted, and means supporting said circuit breaker for movement toward said rear wall to an installed position in which said connectors engage said stabs to connect said circuit breaker in said electric power distribution system and movement away from said rear wall to disconnect said connectors from said stabs for removal of said circuit breaker from said enclosure;
- interlock means comprising linking means linking said circuit breaker with said another circuit breaker, and actuating means associated with said circuit breaker for actuating said linking means to prevent closing of said another circuit breaker when said circuit breaker is in said installed position and said separable contacts of said circuit breaker are closed; and
- prevent means preventing actuation of said link means when said circuit breaker is not in said installed position.

BRIEF DESCRIPTION OF THE DRAWINGS

A full understanding of the invention can be gained from the following description of the preferred embodiments when read in conjunction with the accompanying drawings in which:

FIG. 1 is a schematic view of a pair of circuit breakers interlocked by cable interlocks.

FIG. 2 is an isometric view with parts broken away of one of the interlocked circuit breakers of FIG. 1.

FIG. 4 is a view similar to that of FIG. 3 showing the circuit breaker fully installed in its enclosure and with the shutter assembly open.

FIG. 5 is a vertical view of a portion of the cable interlock shown unactuated in full line and actuated in phantom.

FIG. 7 is a vertical view of the shutter assembly and a portion of the cable interlock shown with the shutter assembly in the closed position and with the interlock blocked.

DESCRIPTION OF THE PREFERRED EMBODIMENT

Figure 3:
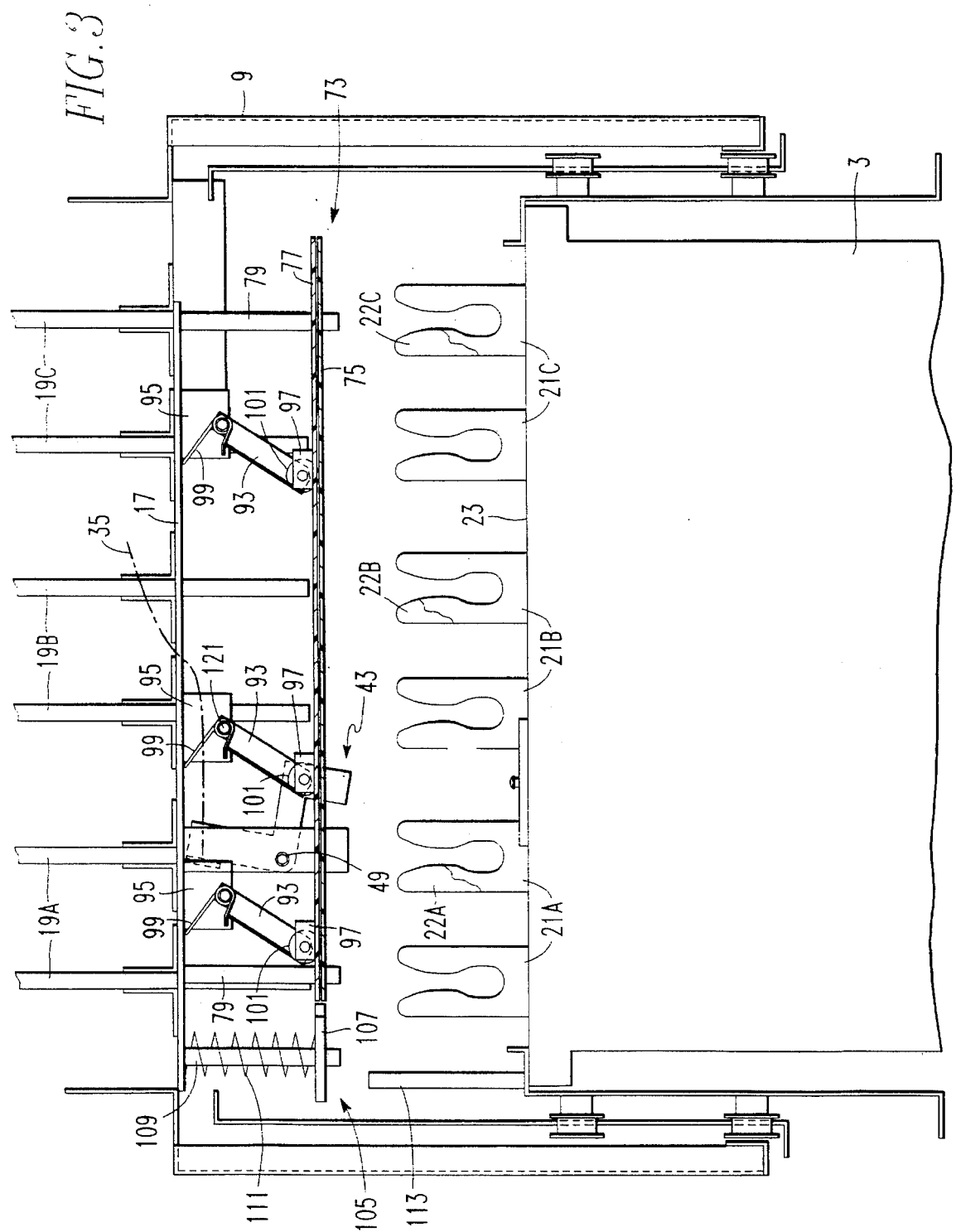
FIG. 3 is a horizontal sectional view through a circuit breaker incorporating a cable interlock and a shutter assembly in accordance with the invention and with the circuit breaker partially withdrawn from its enclosure and with the shutter assembly closed.
Figure 6:
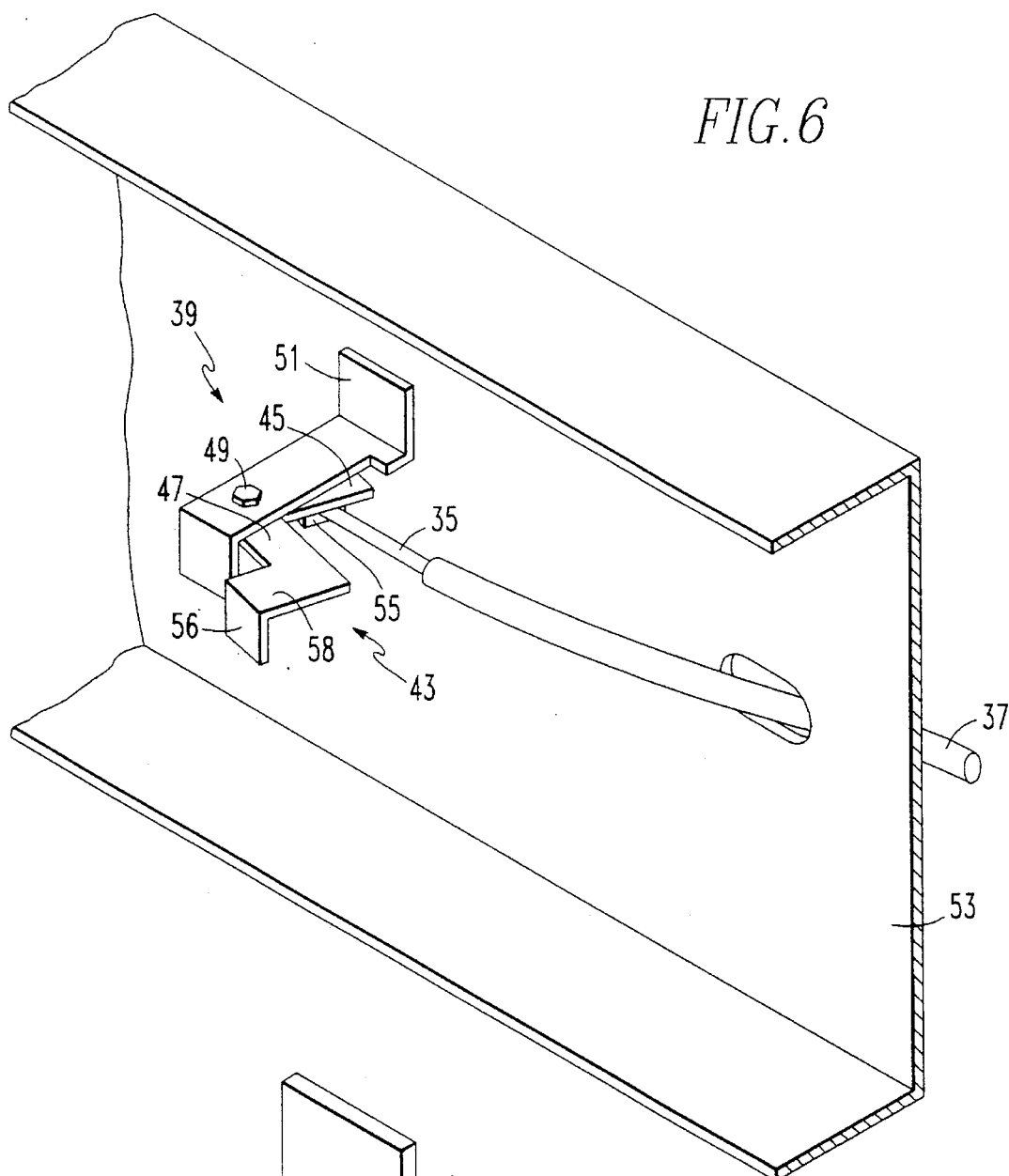
FIG. 6 is an isometric view in enlarged scale of a portion of FIG. 2.

FIG. 1 illustrates generally the application of the invention in which the operation of a pair of circuit breakers 3A and 3B is coordinated by an interlock system 5 comprising a pair of cable interlocks 7A and 7B. As each of the circuit breakers 3A and 3B and their respective mountings are identical, only the pertinent features of a single circuit brewer 3 and its installation will be described in detail.

The circuit breaker 3 is a draw-out unit which is mounted in an enclosure such as the cassette 9 shown in FIG. 2. The circuit breaker 3 is removably supported in the cassette 9 by the rollers 11 engaging extendable guides 13 mounted in the cassette 9, all in a well known manner. Three-phase lineside conductors terminate in pairs of lineside stabs 15A, 15B and 15C mounted on the rear wall 17 of the cassette 9. Similarly, the loadside conductors terminate in pairs of loadside stabs 19A, B, and C. As can be seen from FIGS. 3 and 4, pairs of finger connectors 21A, B, and C projecting from the rear face 23 of the circuit breaker 3 engage the lineside stabs as the circuit breaker is installed. Similar finger connectors 22A, B, and C engage the loadside stabs 19A, B, and C.

As shown in FIG. 1, the circuit breakers 3A and B each have separable contacts 25A and 25B for each phase (only one phase shown schematically) which when closed complete an electrical circuit between the lineside stabs 15A, B and C and the loadside stabs 19A, B, and C. The circuit breakers 3A and B further each include a trip mechanism 27A and 27B which, as is well known, opens the separable contacts 25A and 25B to interrupt current flow in response to certain current conditions. The trip mechanism 27A and 27B can also be operated by a trip lever 29A and 29B mounted on the side of the respective circuit breakers and actuated by the interlock system 5 in a manner to be discussed. Each of these circuit breakers also includes an actuator for the interlock system 5 in the form of a pin 31A and 31B. When the separable contacts 25 of a circuit breaker are closed, such as the contacts 25B of the circuit breaker 3B in FIG. 1, the actuator pin 31B protrudes from the rear face 23B of the circuit breaker, otherwise it is retracted as shown in the case of the circuit breaker 3A in FIG. 1. These pins 31A and 31B actuate the interlock system 5.

The cable interlocks 7A and 7B of the interlock system 5 each forms a link between the actuator pin 31 on one circuit breaker and the trip lever 29 on the other circuit breaker. Each of the cable interlocks 7 includes a flexible cable 35 housed in a protective sheath 37 (see FIG. 5). The cable interlocks 7 each further include a drive device 39 at one end of the cable 35 and an operator 41 at the other end.

The drive device 39 of the cable interlock 7 is a pivot member in the form of a bell crank 43 having a pair of arms 45 and 47. The bell crank 43 is pivotally mounted by a pivot pin 49 to a bracket 51 secured to a channel member 53 extending across the rear wall 17 of the cassette 9. One end of the cable 35 is secured to a flange 55 extending downward from a free end of the arm 45 of the bell crank 43. A downwardly extending flange 56 on the free end of a lateral extension 58 at the end of the arm 47 is aligned with the plunger 31 of the circuit breaker.

As best seen in FIG. 5, the operator 41 includes an L-shaped pivot arm 57 pivotally mounted by a pivot pin 59 on a support plate 61 secured to a front corner of the cassette 9. The end of the cable 35 is secured to a flange 63 on one leg of the L-shaped pivot arm 57. The sheath 37 of the cable assembly 33 is fixed to the support plate 61 by a bracket 65. A helical compression spring 67 extends along the cable 35 between the bracket 65 and the flange 63 thereby biasing L-shaped pivot arm 57 in a counter clockwise direction as viewed in FIG. 5. The free end 69 of the L-shaped pivot arm 57 supports a roller 71. This roller 71 is vertically aligned with the trip lever 29 on the associated circuit breaker 3 when the circuit breaker is fully installed in the cassette 9.

With the L-shaped pivot arm 57 biased to the counterclockwise position shown in full line in FIG. 5, the other end of the cable 35 attached to the flange 55 on the arm 45 rotates the bell crank 43 clockwise to the extended position shown in FIG. 3. When the circuit breaker 3 is fully installed in the cassette 9 as shown in FIG. 4, closure of the separable contacts 25 causes the plunger 31 to extend from the rear face 23 of the circuit breaker 3 and engage the flange 56 on the extension 58 of the arm 47. This rotates the bell crank 43 counterclockwise which pulls on the cable 35 thereby rotating the L-shaped pivot arm 57 clockwise to the position shown by the phantom lines in FIG. 5. This in turn raises the roller 71 which lifts the trip lever 29 on the opposing circuit breaker. Thus, for instance, with the circuit brewer 3B installed as shown in FIG. 1 and the separable contacts 25B closed, the plunger 31B is extended to rotate the bell crank 43B counterclockwise. With the circuit brewer 3A installed, the trip lever 29A is raised such that the contacts 25A cannot be closed. The rear edge 29R of the lever arm 29 is beveled upward so that if the contacts of the opposite circuit breaker are closed when a circuit breaker is installed and therefore the roller 71 is raised, the trip arm 29 will be raised as the circuit breaker is installed.

While this interlock system 5 works very well with both circuit breakers installed in the cassettes 9, a problem arises when one of the circuit breakers is removed, such as for service or replacement. The problem can be appreciated from reference to FIG. 1. If the circuit breaker 3A, for example, is removed from its cassette 9A as shown, the bellcrank 43A is exposed and could be inadvertently or otherwise actuated. This would result in actuation of the trip lever 29B to trip the circuit breaker 3B open. As mentioned previously, this could have very serious consequences, especially in the case of a transfer switch used in an application where power must be continuously supplied to a load. While the circuit breakers 3A and 3B can be used to supply alternate power sources to the load, with the circuit brewer 3A removed, tripping of the circuit breaker 3B leaves the load without power. An important goal of the present invention is to preclude this from occurring by preventing operation of the cable interlock 7A when the circuit breaker 3A is removed from its cassette 9A.

As also mentioned above, some draw-out circuit breakers have been provided with shutters which prevent inadvertent contact with the stabs 15A—C and 19A—C when the circuit breaker is removed. Up to now, the draw-out circuit breaker has been provided either with the shutters or a cable interlock, but not both, as they compete for space behind the circuit breaker. The present invention not only provides an arrangement in which both an interlock and a shutter can be used together on a draw-out circuit breaker, but also provides that the shutter can be used to preclude inadvertent operation of the cable interlock when a circuit breaker is removed from its cassette.

As shown in FIGS. 3, 4, 7 and 8, the shutter 73 comprises a front panel 75 and a rear panel 77 which slides laterally with respect to the front panel. Both panels are made of an electrically insulating material such as fiber glass. The front panel 75 is supported on guide pins 79 extending forward from the rear wall 17 of the cassette 9. The front panel 75 has pairs of slots 81 A, B, and C aligned with the lineside stabs 15A, B, and C and a second set of pairs of slots 83A, B, and C aligned with the loadside stabs 19A, B, and C.

The rear panel 77 is attached to the rear of the front panel by heads of screws 85 which are received in horizontal slots 87 in the front panel so that the rear panel 77 may slide laterally with respect to the panel 75. The rear panel has pairs of slots 89A, B, and C and 91A, B, and C which register with the slots 81A, B, and C and 83A, B, and C in the front panel respectively when the rear panel slides to the left with respect to the front panel as viewed in FIG. 8.

Sliding of the rear panel 77 with respect to the front panel 75 is effected by pivot arms 93 which are pivotally connected at one end to brackets 95 secured to the channel member 53 at the rear wall 17 of the cassette 9. They are pivotally connected at the other end to brackets 97 on the rear of the rear panel 77. Torsion springs 99 bias the pivot arms 93 counterclockwise as viewed in FIGS. 3 and 4. Rollers 101 reduce the friction between the front and rear panels 75 and 77, respectively.

With the circuit breaker 3 removed from the cassette 9, the torsion springs 99 rotate the pivot arms 93 counterclockwise to move the rear panel 77, and therefore the front panel 75 also, forward away from the rear wall 17 of the cassette 9 to the position shown in FIG. 3 where they are in front of the stabs 15A, B, and C and 19A, B, and C. This also results in sliding of the rear panel 77 to the right as viewed in FIGS. 3 and 7 to move the slots 89A, B, and C and the slots 91A, B, and C out of registry with the slots 81A, B, and C, and 83A, B, and C, respectively. This is the closed position of the shutter 73 in which the stabs are enclosed thereby preventing inadvertent contact with them by personnel working inside of the cassette.

When the circuit breaker 3 is installed in the cassette 9, the finger connectors 21 and 22 projecting from the rear face 23 of the circuit breaker 3 engage the shutter 73 and push it toward the rear wall 17 with inward movement of the circuit breaker. As the shutter 73 is pushed rearward, the pivot arms 93 rotate clockwise to slide the rear panel 77 to the left as shown in FIGS. 3 and 7 to bring the slots 89A, B, and C and 91A, B, and C into registry with the slots 81A, B, and C and 83A, B, and C thereby opening the shutter. As the shutter is pushed further rearward, the stabs extend through the registered slots in the shutter so that they can engage the finger connectors 21 on the circuit breaker as shown in FIG. 4.

It can be appreciated, that someone could inadvertently push back the shutter 73 thereby exposing the stabs. In order to preclude this, a safety latch 105 is provided on the shutter 73. The safety latch 105 includes a planar member 107 slidably mounted on a guide rod 109 at one side of the shutter 73. This planar member 107 is spring biased outward into alignment into the rear panel 77 by a helical compression spring 111. With the planar member 107 so aligned, the rear panel 77 cannot slide laterally if rearward pressure is applied to the front panel 75. To release the safety latch 105, the planar member 107 must be moved rearwardly out of alignment with the rear panel 77. This is accomplished during insertion of the circuit breaker 3 by probe 113 which extends farther rearward from the rear face 23 of the circuit breaker 1 than the finger connectors 21 and 22 so that the planar member 107 is first moved out of the alignment with the rear panel 77 before the finger connectors 21 and 22 contact the shutter 73 and begins to move it rearward.

Figure 9:
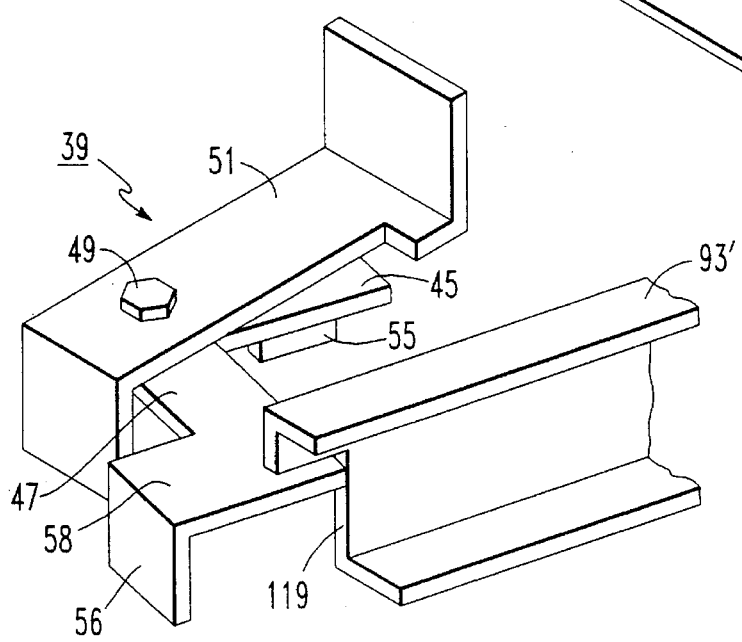
FIG. 9 is an isometric view showing the blocking of operation of the interlock by a pivot arm of the closed shutter assembly.
Figure 8:
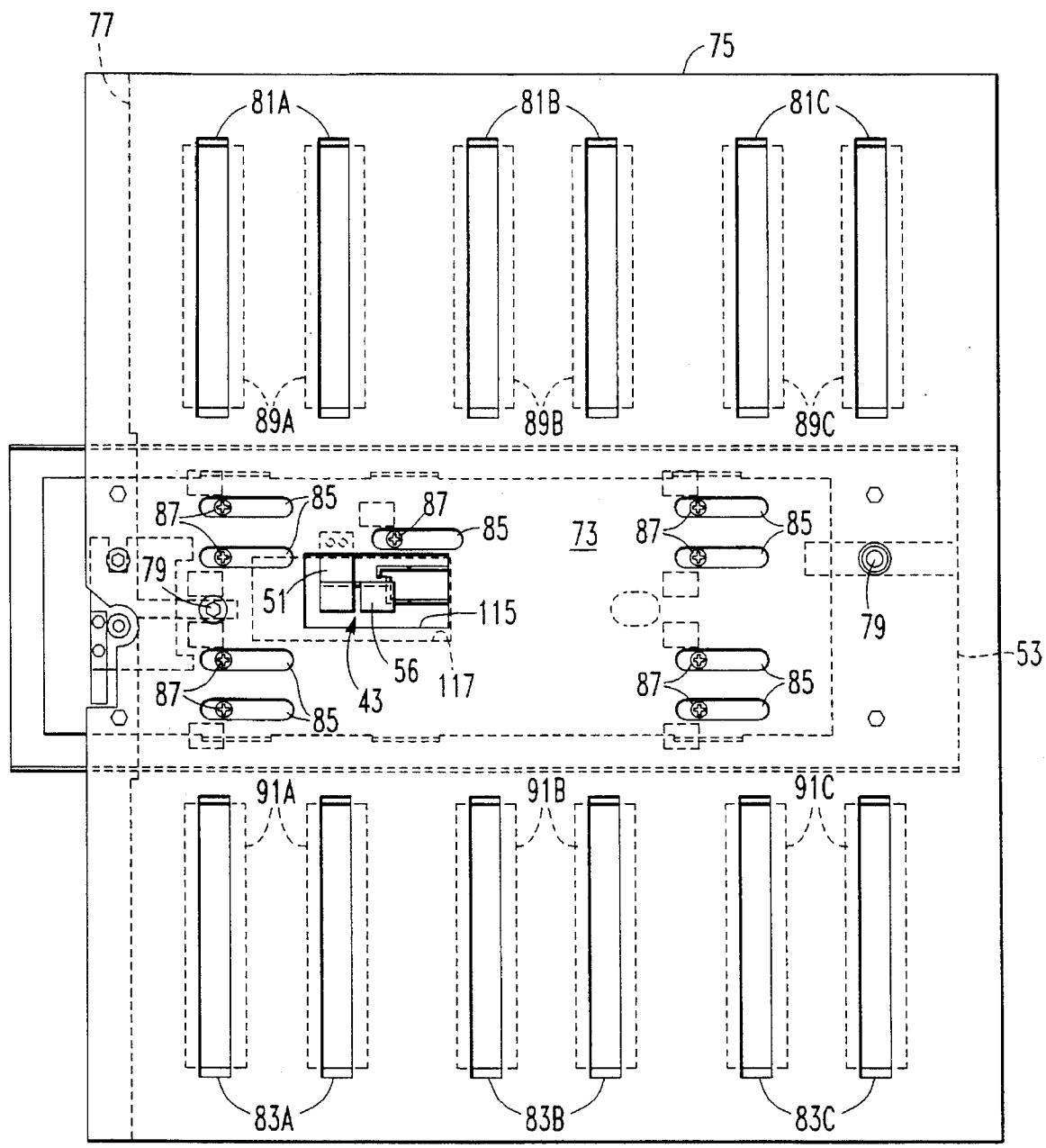
FIG. 8 is a view similar to that of FIG. 7 shown with the shutter assembly open and with the interlock unblocked.

The front panel 75 and rear panel 77 have openings 115 and 117 respectively through which the bell crank 43 of the cable interlock 7 extends. In accordance with the invention, the shutter assembly 73 is arranged so that it blocks operation of the cable interlock 7 when the circuit breaker is removed and the shutter assembly is closed. In the exemplary embodiment of the invention, this blocking function is performed by one of the pivot arms 93. As seen in FIG. 9, the pivot arm 93' is a channel member. A notch 119 in the channel member 93' interferes with pivoting of the bell crank 43 when the shutter is in the closed position shown in FIG. 3. More particularly, with the shutter 73 closed the pivot arm 93' is rotated to a position in which it is engaged by attempted rotation of the arm 47. The force applied by the arm 47 to the notch 119 of the pivot arm 93' acts through the pivot pin 121 pivotally supporting the pivot arm on the bracket 95 (see FIG. 3) so that the bell crank 43 is jammed and can not rotate. As the bell crank 43 is prevented from rotating when blocked by the pivot arm 93', the other circuit breaker cannot be inadvertently tripped. However, when the circuit breaker is installed and the shutter assembly 73 is pushed rearward, the pivot arm 93' is rotated out of the path of the bell crank 43 so that the bell crank may be actuated by the plunger 31 to operate the cable assembly as shown in FIG. 4.

With the present invention both the cable interlock and a shutter can be used with a draw-out circuit breaker. In addition, inadvertent actuation of the interlock is prevented by the shutter assembly when the shutter is closed upon removal of the circuit breaker.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A draw-out circuit breaker unit breaker electrical distribution system having conductors with stabs on ends thereof; said unit comprising:

a first circuit breaker having connectors projecting from a rear face thereof for connection to said stabs, separable contacts for interrupting said current through said conductors, and a trip mechanism for tripping said separable contacts open in response to selected conditions of current in said conductors;

an enclosure having a rear wall in which said stabs on said conductors are mounted and means supporting said first circuit breaker for movement toward said rear wall to an installed position in which said connectors engage said stabs to connect said circuit breaker in a said electric power distribution system, and for movement away from said rear wall to disconnect said connectors from said stabs for removal of said circuit breaker from said enclosure;

a second circuit breaker;

interlock means comprising linking means linking said first circuit breaker with said second circuit breaker, and actuating means associated with said first circuit breaker for actuating said linking means to prevent closing of said second circuit breaker when said first circuit breaker is in said installed position and said separable contacts or said first circuit breaker are closed;

prevent means preventing actuation of said link means when said first circuit breaker is not in said installed position; and said linking means comprising a drive member mounted adjacent said rear wall of said rear wall of said enclosure and a cable attached between said drive member and said second circuit breaker and wherein said actuating means comprises a plunger extending from said rear face of said first circuit breaker when said separable contacts are closed and operating said drive member to actuate said cable when extended with said first circuit breaker in said installed position, and wherein said prevent means prevents operation of said drive member when said first circuit breaker is moved out of said installed position.

2. The unit of claim 1 wherein said drive member comprises a pivot member pivotally mounted adjacent said rear wall and which is rotated by extension of said plunger to actuate said cable.

3. The unit of claim 2 wherein said prevent means is spring biased to block rotation of said pivot member, but is retracted by movement of said first circuit breaker to said installed position.

4. The unit of claim 2 wherein said prevent means comprises shutter means mounted in said enclosure adjacent said stabs and which open as said first circuit breaker is moved toward said installed position for exposing said stabs for engagement with said connectors, and which close to enclose said stabs when said first circuit breaker is moved away frown said installed position, said shutter means preventing rotation of said pivot member when closed.

5. The unit of claim 3 wherein said shutter means comprises a first panel member mounted for forward and rearward movement and having first slots through which said stabs extend when said first panel moves rearward, and having an opening through which said pivot member engages said plunger, a second panel member having second slots therein, and pivot means for sliding said second panel across said first panel to bring said first and second slots into registry to open said shutter means as said panels are moved toward said rear wall by movement of said first circuit breaker toward said installed position, and for sliding said first and second slots out of registry to close said shutter means as said panels move forward, said pivot means blocking said pivot member from pivoting to actuate said cable when said shutter means are closed.

6. The unit of claim 5 wherein said shutter means further includes biasing means biasing said first and second panels forward to close said shutter means, said first and second panels being moved rearward to open said shutter means by movement of first said circuit breaker toward said installed position.

7. The unit of claim 6 wherein said pivot means sliding said second panel of said shutter means is pivotally mounted by a pivot pin and wherein said pivot means is rotated about said pivot pin when said shutter means is closed to a position wherein an attempt to rotate said pivot member causes said pivot member to engage said pivot means and apply a force to said pivot means which passes through said pivot pin thereby jamming said pivot member and preventing rotation of said pivot member.

8. A draw-out circuit breaker unit for an electrical distribution system having conductors with stabs on ends thereof; said unit comprising:

a first circuit breaker having connectors projecting from a rear face thereof for connection to said stabs, separable contacts for interrupting said current through said conductors, and a trip mechanism for tripping said separable contacts open in response to selected conditions of current in said conductors;

an enclosure having a rear wall in which said stabs on said conductors are mounted and means supporting said first circuit breaker for movement toward said rear wall to an installed position in which said connectors engage said stabs to connect said circuit breaker in said electric power distribution system, and for movement away from said rear wall to disconnect said connectors from said stabs for removal of said circuit breaker from said enclosure a second circuit breaker;

interlock means comprising linking means linking said first circuit breaker with said second circuit breaker, and actuating means associated with said first circuit breaker for actuating said linking means to prevent closing of said second circuit breaker when said first circuit breaker is in said installed position and said separable contacts of said first circuit breaker are closed;

prevent means preventing actuation of said link means when said first circuit breaker is not in said installed position; and said prevent means comprising shutter means mounted in said enclosure adjacent said stabs and which open as said first circuit breaker is moved toward said installed position for exposing said stabs for engagement with said connectors and which closes to cover said stabs when said first circuit breaker is moved away from said installed position, said shutter means preventing actuation of said linking means when closed.

9. The unit of claim 8 wherein said shutter means comprises a first panel member mounted for forward and rearward movement and having first slots through which said stabs extend when said first panel moves rearward and having an opening through which said linking means engages said actuating means, a second panel member having second slots therein, and pivot means for sliding said second panel across said first panel to bring said first and second slots into registry to open said shutter means as said panels move toward said rear wall, and to take said first and second slots out of registry to close said shutter means as said panels move forward, said pivot means blocking actuation of said linking means with said shutter means closed.

10. The unit of claim 9 wherein said shutter means further includes biasing means biasing said first and second panels forward to close said shutter means, said first and second panels being moved rearward to open said shutter means by movement of first said circuit breaker toward said installed position.

11. The unit of claim 8 wherein said shutter means includes a safety latch preventing opening of first said shutter means except as said circuit breaker is installed.

* * * * *